(12) United States Patent
Blair et al.

(10) Patent No.: US 12,237,672 B2
(45) Date of Patent: *Feb. 25, 2025

(54) DIRECT-CURRENT POWER DISTRIBUTION IN A CONTROL SYSTEM

(71) Applicant: Lutron Technology Company LLC, Coopersburg, PA (US)

(72) Inventors: Edward J. Blair, Telford, PA (US); John H. Bull, Slatington, PA (US); Samuel F. Chambers, Gwynedd Valley, PA (US); Stuart W. DeJonge, Riegelsville, PA (US); Joseph R. Parks, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,865

(22) Filed: Dec. 18, 2023

(65) Prior Publication Data

US 2024/0120736 A1    Apr. 11, 2024

Related U.S. Application Data

(63) Continuation of application No. 16/809,508, filed on Mar. 4, 2020, now Pat. No. 11,909,204.

(60) Provisional application No. 62/813,552, filed on Mar. 4, 2019.

(51) Int. Cl.
*H02J 1/08* (2006.01)
*H02J 7/00* (2006.01)

(52) U.S. Cl.
CPC .......... *H02J 1/084* (2020.01); *H02J 7/00032* (2020.01); *H02J 7/00712* (2020.01)

(58) Field of Classification Search
CPC .... H02J 1/084; H02J 7/00032; H02J 7/00712; H02J 2207/30; H02J 7/0013; H02J 7/0068; H02J 7/02; H02J 7/342; H02J 1/08

See application file for complete search history.

(56) References Cited

U.S. PATENT DOCUMENTS

| | | |
|---|---|---|
| 5,248,919 A | 9/1993 | Hanna et al. |
| 6,983,783 B2 | 1/2006 | Carmen et al. |
| 7,391,297 B2 | 6/2008 | Cash et al. |
| 7,839,109 B2 | 11/2010 | Carmen et al. |
| 8,009,042 B2 | 8/2011 | Steiner et al. |
| 8,199,010 B2 | 6/2012 | Sloan et al. |

(Continued)

*Primary Examiner* — Lincoln D Donovan
*Assistant Examiner* — Alex W Lam
(74) *Attorney, Agent, or Firm* — Flaster Greenberg P.C.

(57) ABSTRACT

A control system may include a direct-current (DC) power bus for charging (e.g., trickle charging) internal energy storage elements in control devices of the control system. For example, the control devices may be motorized window treatments configured to adjust a position of a covering material to control the amount of daylight entering a space. The system may include a DC power supply that may generate a DC voltage on the DC power bus. For example, the DC power bus may extend from the DC power supply around the perimeter of a floor of the building and may be connected to all of the motorized window treatments on the floor (e.g., in a daisy-chain configuration). Wiring the DC power bus in such a manner may dramatically reduce the installation labor and wiring costs of an installation, as well as decreasing the chance of a miswire.

20 Claims, 10 Drawing Sheets

(56) References Cited

U.S. PATENT DOCUMENTS

| | | |
|---|---|---|
| 8,228,184 B2 | 7/2012 | Blakeley et al. |
| 8,288,981 B2 | 10/2012 | Zaharchuk et al. |
| 8,410,706 B2 | 4/2013 | Steiner et al. |
| 8,451,116 B2 | 5/2013 | Steiner et al. |
| 8,950,461 B2 | 2/2015 | Adams et al. |
| 9,679,696 B2 | 6/2017 | Bhutani et al. |
| 9,810,020 B2 | 11/2017 | Adams et al. |
| 2004/0217739 A1 | 11/2004 | Cummings |
| 2008/0092075 A1 | 4/2008 | Jacob et al. |
| 2009/0308543 A1 | 12/2009 | Kates |
| 2013/0030589 A1 | 1/2013 | Pessina et al. |
| 2016/0241029 A1* | 8/2016 | Hodrinsky .............. H02J 7/342 |
| 2017/0123390 A1 | 5/2017 | Barco et al. |
| 2017/0356243 A1* | 12/2017 | Feldstein .............. H02J 7/0024 |
| 2019/0032404 A1 | 1/2019 | Chacon et al. |
| 2019/0214845 A1 | 7/2019 | Hausman et al. |
| 2022/0341259 A1 | 10/2022 | Chacon et al. |

* cited by examiner

DIRECT-CURRENT POWER DISTRIBUTION IN A CONTROL SYSTEM

CROSS-REFERENCE TO RELATED APPLICATIONS

This application is a continuation of U.S. Non-Provisional patent application Ser. No. 16/809,508, filed Mar. 4, 2020, which claims the benefit of U.S. Provisional Patent Application No. 62/813,552, filed Mar. 4, 2019, the contents of which are incorporated herein by reference in their entirety.

BACKGROUND

A typical window treatment, such as a roller shade, a drapery, a roman shade, and/or a venetian blind, may be mounted in front of a window or opening to control an amount of light that may enter a user environment and/or to provide privacy. A covering material (e.g., a shade fabric) on the window treatment may be adjusted to control the amount of daylight from entering the user environment and/or to provide privacy. The covering material may be manually controlled and/or automatically controlled using a motorized drive system to provide energy savings and/or increased comfort for occupants. For example, the covering material may be raised to allow light to enter the user environment and allow for reduced use of lighting systems. The covering material may also be lowered to reduce the occurrence of sun glare.

SUMMARY

A control system may include a direct-current (DC) power bus for charging (e.g., trickle charging) internal energy storage elements in control devices of the control system. For example, the control devices may be motorized window treatments configured to adjust a position of a covering material to control the amount of daylight entering a space. The system may include a DC power supply that may generate a DC voltage on the DC power bus. For example, the DC power bus may extend from the DC power supply around the perimeter of a floor of the building and may be connected to all of the motorized window treatments on the floor (e.g., in a daisy-chain configuration). Wiring the DC power bus in such a manner may dramatically reduce the installation labor and wiring costs of an installation, as well as decreasing the chance of a miswire.

Each control device may be configured to control when the internal energy storage element charges from the DC bus voltage. For example, each control device may be configured to determine when to charge the internal energy storage element from the DC bus voltage in response to a message received via a communication circuit. Each control device may be configured to transmit a message including a storage level of the internal energy storage element. The storage level of the internal storage element may be a percentage of a maximum capacity (e.g., 60% of the maximum storage capacity) or a percentage of a maximum voltage, or a preset voltage level of the internal storage element.

DETAILED DESCRIPTION

Figure 1:
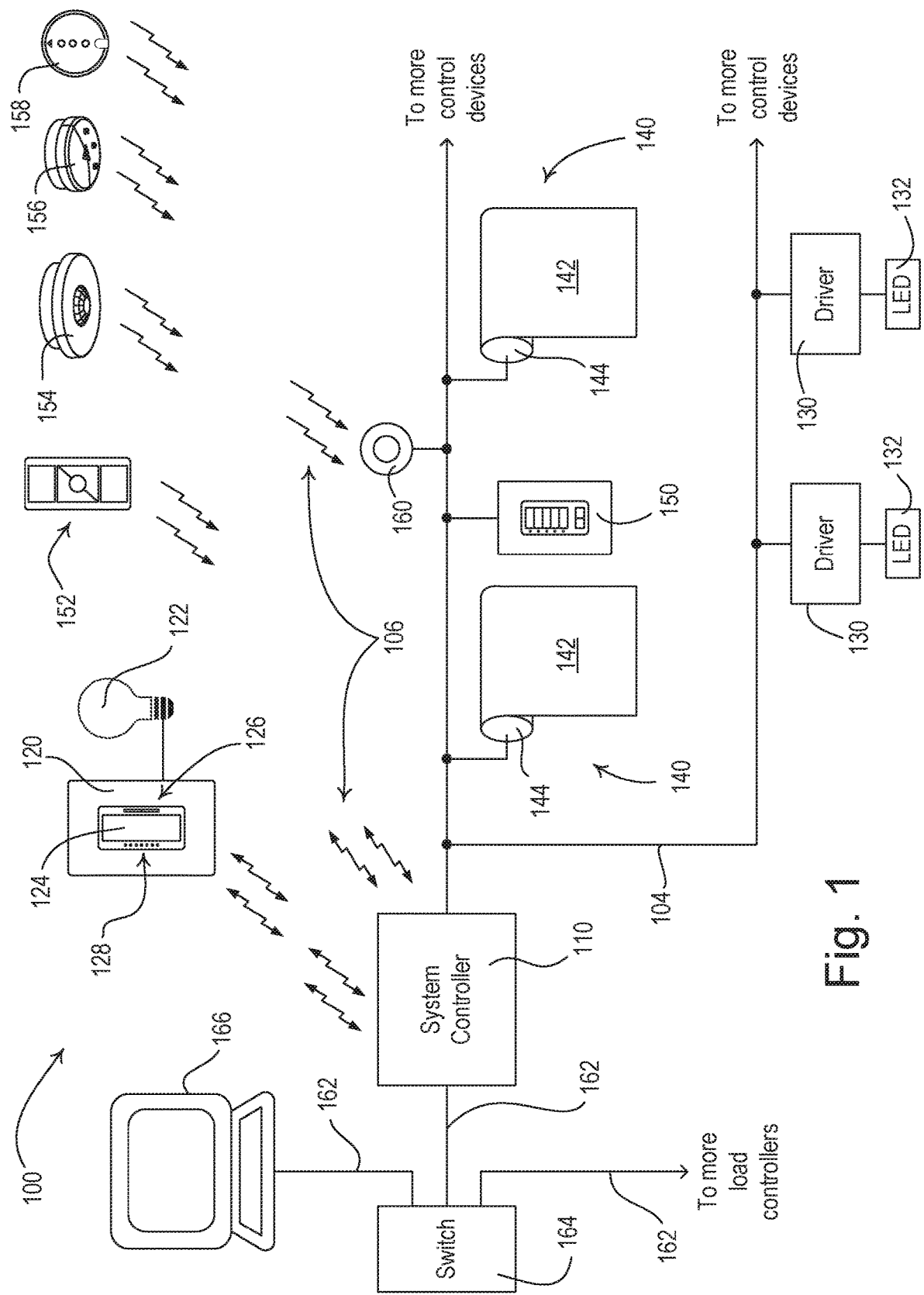
FIG. 1 is a simplified block diagram of a load control system having load control devices and motorized window treatments.

FIG. 1 is a simple diagram of an example load control system for controlling the amount of power delivered from an alternating-current (AC) power source (not shown) to one or more electrical loads. The load control system 100 may comprise a system controller 110 (e.g., a load controller or a central controller) operable to transmit and/or receive digital messages via a wired and/or a wireless communication link. For example, the system controller 110 may be coupled to one or more wired control devices via a wired digital communication link 104. The system controller 110 may be configured to transmit and/or receive wireless signals, e.g., radio-frequency (RF) signals 106, to communicate with one or more wireless control devices. The load control system 100 may comprise a number of control-source devices and/or a number of control-target devices for controlling an electrical load. The control-source devices may be input devices operable to transmit digital messages configured to control an electrical load via a control-target device. For example, control-source devices may transmit the digital messages in response to user input, occupancy/vacancy conditions, changes in measured light intensity, or other input information. The control-target devices may be load control devices operable to receive digital messages and control respective electrical loads in response to the received digital messages. A single control device of the load control system 100 may operate as both a control-source and a control-target device. The system controller 110 may be configured to receive digital messages from the control-source devices and transmit digital messages to the control-target devices in response to the digital messages received from the control-source devices. The control-source devices and the control-target devices may also, or alternatively, communicate directly.

The load control system 100 may comprise a load control device, such as a dimmer switch 120, for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator 124 (e.g., a button) and/or an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and increase or decrease the intensity of the lighting load from a minimum intensity (e.g., approximately 1%) to a maximum intensity (e.g., approximately 100%). The dimmer switch 120 may further comprise a plurality of visual indicators 128, e.g., light-emitting diodes (LEDs), which may be arranged in a linear array and/or may be illuminated to provide feedback of the intensity of the lighting load 122. The dimmer switch 120 may be configured to receive digital messages from the system controller 110 via the RF signals 106 and to control the lighting load 122 in response to the received digital messages. The dimmer switch 120 may also, or alternatively, be coupled to the wired digital communication link 104. Examples of wall-mounted dimmer switches are described in greater detail in U.S. Pat. No. 5,248,919, issued Sep. 28, 1993, entitled LIGHTING CONTROL DEVICE, and U.S. Pat. No. 9,679,696, issued Jun. 13, 2017, entitled WIRELESS LOAD CONTROL DEVICE, the entire disclosures of which are hereby incorporated by reference.

The load control system 100 may further comprise one or more remotely-located load control devices, such as light-emitting diode (LED) drivers 130 for driving respective LED light sources 132 (e.g., LED light engines). The LED drivers 130 may be located remotely, for example, in the lighting fixtures of the respective LED light sources 132. The LED drivers 130 may be configured to receive digital messages from the system controller 110 via the digital communication link 104 and to control the respective LED light sources 132 in response to the received digital messages. The LED drivers 130 may be coupled to a separate digital communication link, such as an Ecosystem® or digital addressable lighting interface (DALI) communication link, and the load control system 100 may include a digital lighting controller coupled between the digital communication link 104 and the separate communication link. The LED drivers 132 may include internal RF communication circuits or be coupled to external RF communication circuits (e.g., mounted external to the lighting fixtures, such as to a ceiling) for transmitting and/or receiving the RF signals 106. The load control system 100 may further comprise other types of remotely-located load control devices, such as, for example, electronic dimming ballasts for driving fluorescent lamps.

The load control system 100 may further comprise a plurality of daylight control devices, e.g., motorized window treatments, such as motorized roller shades 140, to control the amount of daylight entering the building in which the load control system may be installed. A motorized roller shades 140 may comprise a covering material (e.g., a window treatment fabric 142). The covering material may be wound around a roller tube for raising and/or lowering the window treatment fabric 142. The motorized roller shades 140 may comprise motor drive units 144 (e.g., electronic drive units). The motor drive units 144 may be located inside the roller tube of the motorized roller shade. The motor drive units 144 may be coupled to the digital communication link 104 for transmitting and/or receiving digital messages. The motor drive units 144 may include a control circuit. The control circuit may be configured to adjust the position of the window treatment fabric 142, for example, in response to digital messages received from the system controller 110 via the digital communication link 104. Each of the motor drive units 144 may include memory for storing association information for associations with other devices and/or instructions for controlling the motorized roller shade 140. The motor drive units 144 may comprise an internal RF communication circuit. The motor drive units 144 may also, or alternatively, be coupled to an external RF communication circuit (e.g., located outside of the roller tube) for transmitting and/or receiving the RF signals 106. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, a controllable circuit breaker, or other switching device for turning an appliance on and off; a plug-in load control device, a controllable electrical receptacle, or a controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of a heating, ventilation, and air conditioning (HVAC) system; an air conditioner; a compressor; an electric baseboard heater controller; a controllable damper; a variable air volume controller; a fresh air intake controller; a ventilation controller; hydraulic valves for use in radiators and radiant heating systems; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices, e.g., such as a wired keypad device 150, a battery-powered remote control device 152, an occupancy sensor 154, a daylight sensor 156, and/or a shadow sensor 158. The wired keypad device 150 may be configured to transmit digital messages to the system controller 110 via the digital communication link 104 in response to an actuation of one or more buttons of the wired keypad device. The battery-powered remote control device 152, the occupancy sensor 154, the daylight sensor 156, and/or the shadow sensor 158 may be wireless control devices (e.g., RF transmitters) configured to transmit digital messages to the system controller 110 via the RF signals 106 (e.g., directly to the system controller). For example, the battery-powered remote control device 152 may be configured to transmit digital messages to the system controller 110 via the RF signals 106 in response to an actuation of one or more buttons of the battery-powered remote control device 152. The occupancy sensor 154 may be configured to transmit digital messages to the system controller 110 via the RF signals 106 in response to detection of occupancy and/or vacancy conditions in the space in which the load control system 100 may be installed. The daylight sensor 156 may be configured to transmit digital messages to the system controller 110 via the RF signals 106 in response to detection of different amounts of natural light intensity. The shadow sensor 158 may be configured to transmit digital messages to the system controller 110 via the RF signals 106 in response to detection of an exterior light intensity coming from outside the space in which the load control system 100 may be installed. The system controller 110 may be configured to transmit one or more digital messages to the load control devices (e.g., the dimmer switch 120, the LED drivers 130, and/or the motorized roller shades 140) in response to the received digital messages, e.g., from the wired keypad device 150, the battery-powered remote control device 152, the occupancy sensor 154, the daylight sensor 156, and/or the shadow sensor 158. While the system controller 110 may receive digital messages from the input devices and/or transmit digital messages to the load control devices for controlling an electrical load, the input devices may communicate directly with the load control devices for controlling the electrical load.

The load control system 100 may comprise a wireless adapter device 160 that may be coupled to the digital communication link 104. The wireless adapter device 160 may be configured to receive the RF signals 106. The wireless adapter device 160 may be configured to transmit a digital message to the system controller 110 via the digital communication link 104 in response to a digital message received from one of the wireless control devices via the RF signals 106. For example, the wireless adapter device 160 may re-transmit the digital messages received from the wireless control devices on the digital communication link 104.

The occupancy sensor 154 may be configured to detect occupancy and/or vacancy conditions in the space in which the load control system 100 may be installed. The occupancy sensor 154 may transmit digital messages to the system controller 110 via the RF signals 106 in response to detecting the occupancy and/or vacancy conditions. The system controller 110 may be configured to turn one or more of the lighting load 122 and/or the LED light sources 132 on and off in response to receiving an occupied command and a vacant command, respectively. The occupancy sensor 154 may operate as a vacancy sensor, such that the lighting loads are turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity in the space in which the load control system is installed. The daylight sensor 156 may transmit digital messages including the measured light intensity to the system controller 110 via the RF signals 106. The digital messages may be used to control an electrical load (e.g., the intensity of lighting load 122, the motorized window shades 140 for controlling the level of the covering material, the intensity of the LED light sources 132) via one or more control load control devices (e.g., the dimmer switch 120, the motor drive unit 144, the LED driver 130). Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The shadow sensor 158 may be configured to measure an exterior light intensity coming from outside the space in which the load control system 100 may be installed. The shadow sensor 158 may be mounted on a façade of a building, such as the exterior or interior of a window, to measure the exterior natural light intensity depending upon the location of the sun in sky. The shadow sensor 158 may detect when direct sunlight is directly shining into the shadow sensor 158, is reflected onto the shadow sensor 158, or is blocked by external means, such as clouds or a building, and may send digital messages indicating the measured light intensity. The shadow sensor 158 may transmit digital messages including the measured light intensity to the system controller 110 via the RF signals 106. The digital messages may be used to control an electrical load (e.g., the intensity of lighting load 122, the motorized window shades 140 for controlling the level of the covering material, and/or the intensity of the LED light sources 132) via one or more control load control devices (e.g., the dimmer switch 120, the motor drive unit 144, and/or the LED driver 130). The shadow sensor 158 may also be referred to as a window sensor, a cloudy-day sensor, or a sun sensor.

The load control system 100 may comprise other types of input device, such as: temperature sensors; humidity sensors; radiometers; pressure sensors; smoke detectors; carbon monoxide detectors; air quality sensors; motion sensors; security sensors; proximity sensors; fixture sensors; partition sensors; keypads; kinetic- or solar-powered remote controls; key fobs; cell phones; smart phones; tablets; personal digital assistants; personal computers; laptops; timeclocks; audio-visual controls; safety devices; power monitoring devices (such as power meters, energy meters, utility submeters, utility rate meters); central control transmitters; residential, commercial, or industrial controllers; or any combination of these input devices. These input devices may transmit digital messages to the system controller 110 via the RF signals 106. The digital messages may be used to control an electrical load (e.g., the intensity of lighting load 122, the motorized window shades 140 for controlling the level of the covering material, and/or the intensity of the LED light sources 132) via one or more control load control devices (e.g., the dimmer switch 120, the motor drive unit 144, and/or the LED driver 130).

The system controller 110 may be configured to control the load control devices (e.g., the dimmer switch 120, the LED drivers 130, and/or the motorized roller shades 140) according to a timeclock schedule. The timeclock schedule may be stored in a memory in the system controller. The timeclock schedule may be defined by a user of the system controller (e.g., a system administrator using a programming mode of the system controller 110). The timeclock schedule may include a number of timeclock events. The timeclock events may have an event time and a corresponding command or preset. The system controller 110 may be configured to keep track of the present time and/or day. The system controller 110 may transmit the appropriate command or preset at the respective event time of each timeclock event. An example of a load control system for controlling one or more motorized window treatments according to a timeclock schedule is described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

The load control system 100 may be part of an automated window treatment control system. The system controller 110 may control the shades according to automated window treatment control information. For example, the automated window treatment control information may include the angle of the sun, sensor information, an amount of cloud cover, and/or weather data, such as historical weather data and real-time weather data. For example, throughout course of calendar day, the system controller 110 of the automated window treatment control system may adjust the position of the window treatment fabric multiple times, based on the calculated position of the sun or sensor information. The automated window treatment control system may determine the position of the window treatments in order to affect a performance metric. The automated window treatment system may command the system controller 110 to adjust the window treatments to the determined position in order to affect a performance metric. The automated window treatment control system may operate according to a timeclock schedule. Based on the timeclock schedule, the system controller may change the position of the window treatments throughout a calendar day. The timeclock schedule may be set to prevent the daylight penetration distance from exceeding a maximum distance into an interior space (e.g., work space, transitional space, or social space). The maximum daylight penetration distance may be set to a user's workspace. The system controller 110 may adjust the position of the window treatments according to collected sensor information.

The system controller 110 may be operable to be coupled to a network, such as a wireless or wired local area network (LAN) via a network communication bus 162 (e.g., an Ethernet communication link), e.g., for access to the Internet. The system controller 110 may be connected to a network switch 164 (e.g., a router or Ethernet switch) via the network communication bus 162 for allowing the system controller 110 to communicate with other system controllers for controlling other electrical loads. The system controller 110 may be wirelessly connected to the network, e.g., using Wi-Fi technology. The system controller 110 may be configured to communicate via the network with one or more network devices, such as a smart phone (e.g., an iPhone® smart phone, an Android® smart phone, a Windows® smart phone, or a Blackberry® smart phone), a personal computer 166, a laptop, a tablet device, (e.g., an iPad® hand-held computing device), a Wi-Fi or wireless-communication-capable television, and/or any other suitable wireless communication device (e.g., an Internet-Protocol-enabled device). The network device may be operable to transmit digital messages to the system controller 110 in one or more Internet Protocol packets. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and/or configured using the personal computer 166 or other network device. The personal computer 166 may execute a graphical user interface (GUI) configuration software for allowing a user to program how the load control system 100 may operate. The configuration software may generate load control information (e.g., a load control database) that defines the operation and/or performance of the load control system 100. For example, the load control information may include information regarding the different load control devices of the load control system (e.g., the dimmer switch 120, the LED drivers 130, and/or the motorized roller shades 140). The load control information may include information regarding associations between the load control devices and the input devices (e.g., the wired keypad device 150, the battery-powered remote control device 152, the occupancy sensor 154, the daylight sensor 156, and/or the shadow sensor 158), and/or how the load control devices may respond to input received from the input devices. Examples of configuration procedures for load control systems are described in greater detail in commonly-assigned U.S. Pat. No. 7,391,297, issued Jun. 24, 2008, entitled HANDHELD PROGRAMMER FOR LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2017/0123390, published May 4, 2017, entitled COMMISSIONING LOAD CONTROL SYSTEMS, the entire disclosure of which is hereby incorporated by reference.

The system controller 110 may be configured to automatically control the motorized window treatments (e.g., the motorized roller shades 140). The motorized window treatments may be controlled to save energy and/or improve the comfort of the occupants of the building in which the load control system 100 may be installed. For example, the system controller 110 may be configured to automatically control the motorized roller shades 140 in response to a timeclock schedule, the daylight sensor 156, and/or the shadow sensor 158. The roller shades 140 may be manually controlled by the wired keypad device 150 and/or the battery-powered remote control device 152.

Figure 2A:
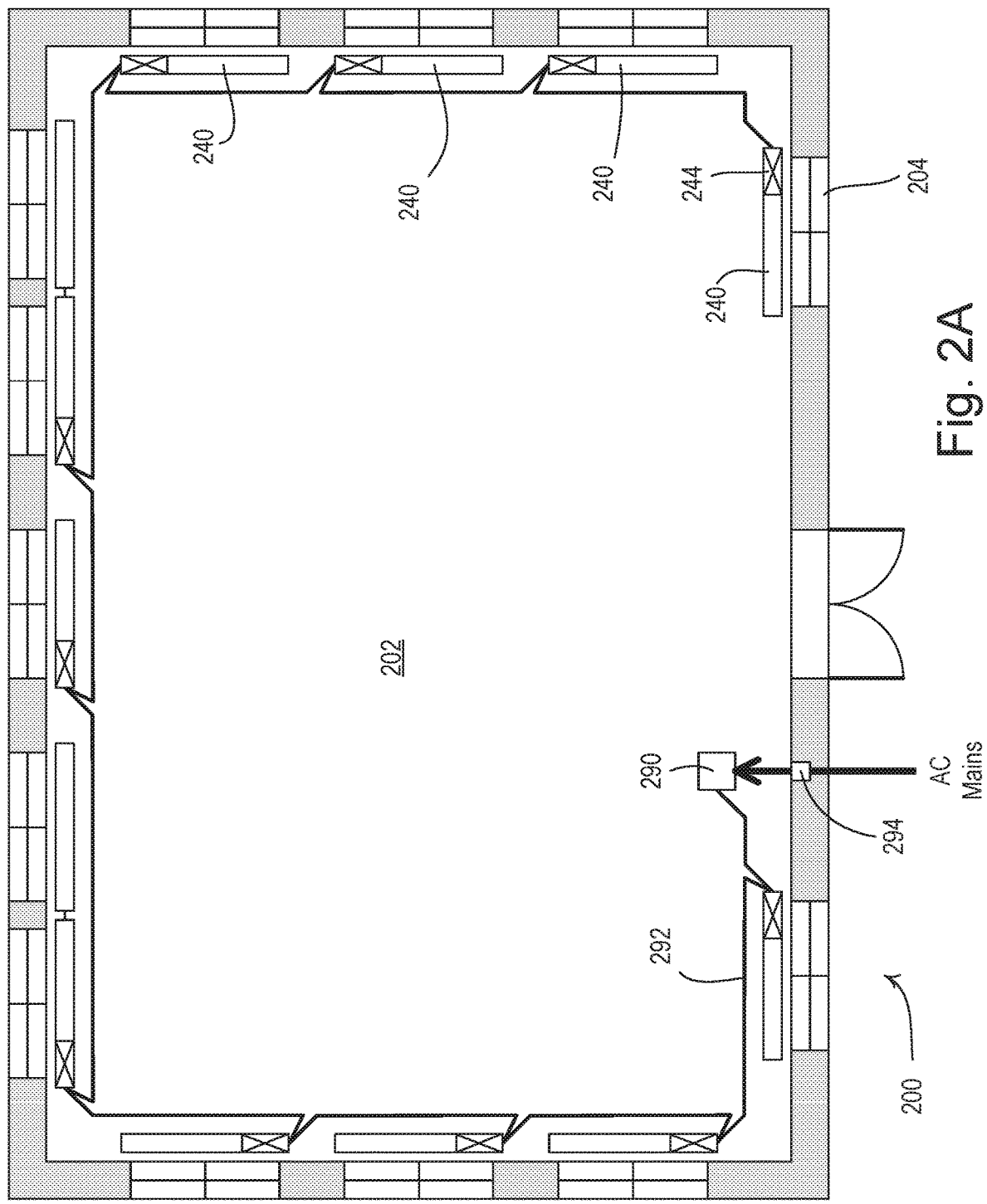
FIGS. 2A-2C are floorplan views of a direct-current (DC) power distribution system for a control system.
Figure 2B:
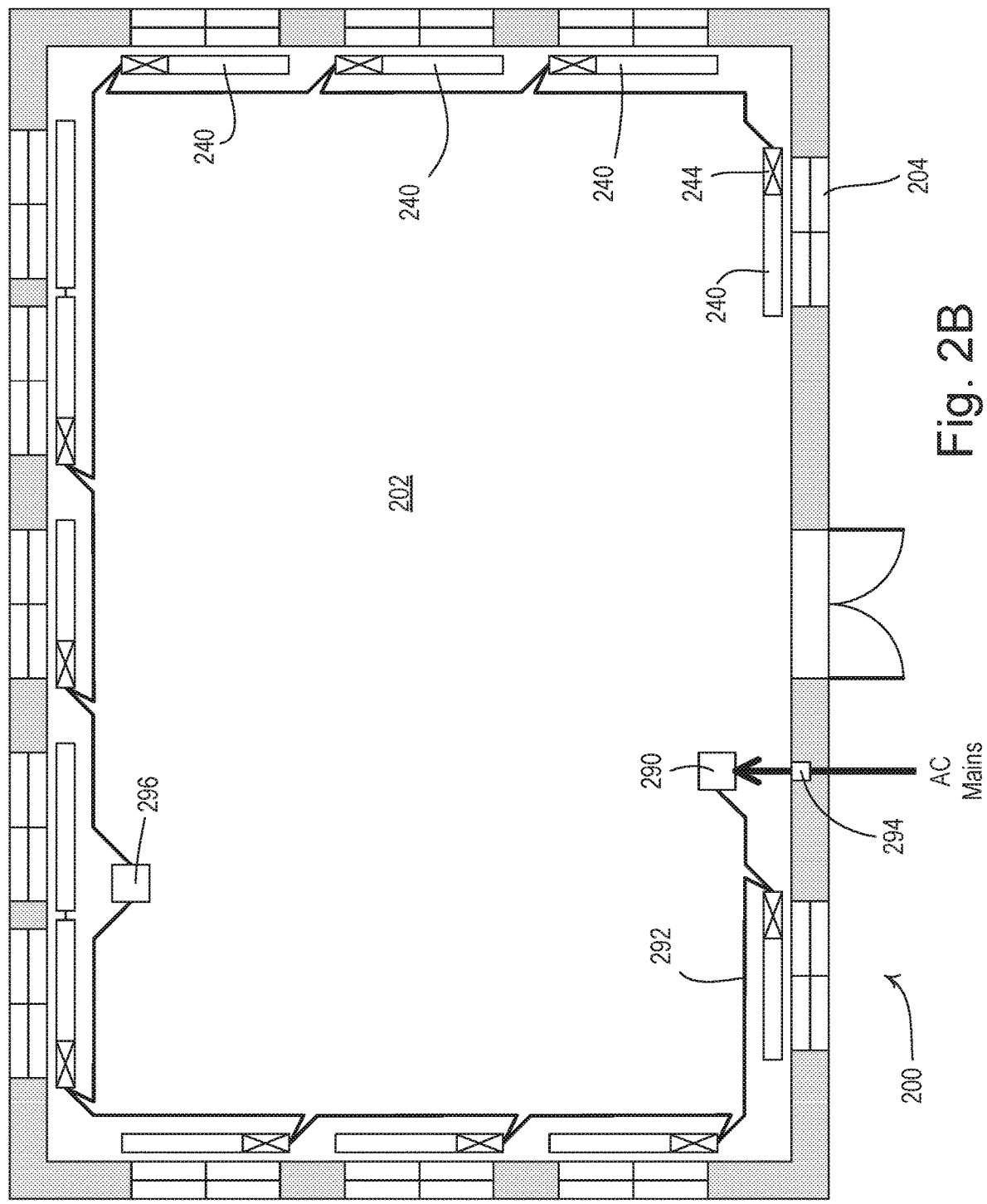
Figure 2C:
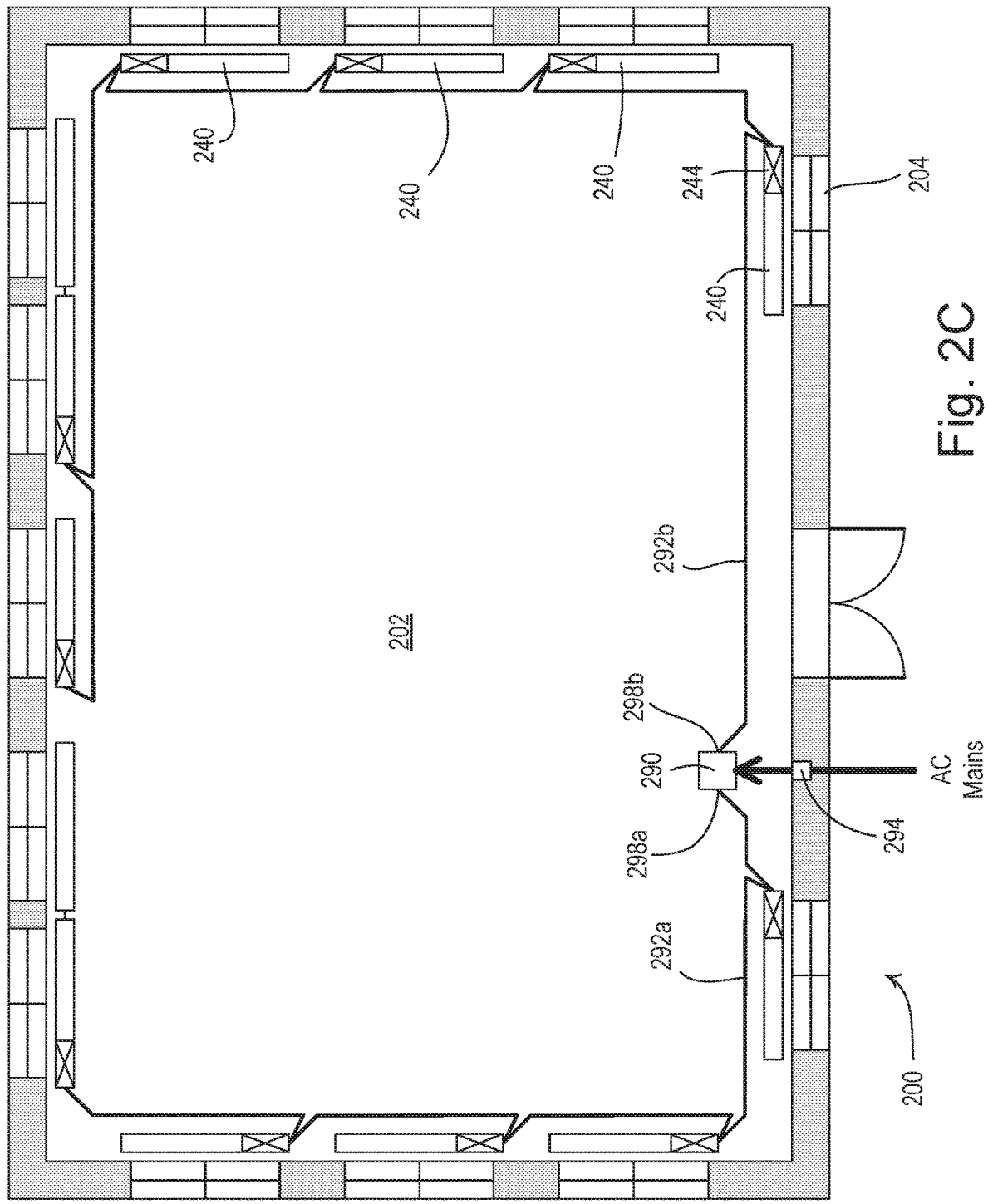

FIGS. 2A-2C are floorplan views of a direct-current (DC) power distribution system 200 for a control system (e.g., the load control system 100 shown in FIG. 1) that may be installed in a building 202. The control system may comprise one or more motorized window treatments 240 (e.g., the motorized roller shades 140 shown in FIG. 1) for controlling the amount of daylight entering the building 202 through respective windows 204. Each motorized window treatment 240 may comprise a respective roller tube and a respective covering material (not shown), such as the window treatment fabric 142 of the motorized roller shades 140 shown in FIG. 1. The motorized window treatments 240 may also comprise respective motor drive units 244 (e.g., the motor drive units 144 shown in FIG. 1) configured to adjust the positions of the respective covering materials. Each motor drive unit 244 may comprise an internal energy storage element, such as one or more rechargeable batteries and/or supercapacitors (e.g., as will be described in greater detail below).

The DC power distribution system 200 may comprise a DC power supply 290 (e.g., a Class 2 power supply), which may be electrically coupled to the motor drive units 244 of the motorized window treatments 240 via a DC power bus 292. The DC power supply 290 may be electrically coupled to an alternating-current (AC) mains supply for receiving an AC mains line voltage. The DC power supply 290 may be configured to generate (e.g. from the AC mains line voltage) a DC bus voltage on the DC power supply 292 for charging (e.g., trickle charging) the energy storage elements of the motor drive units 244. The DC power bus 292 may be electrically coupled to the motor drive units 244 in a daisy-chain configuration (e.g. in parallel). For example, each motor drive unit 244 may comprise two power connectors (e.g., a power-in connector and a power-out connector) to allow for each daisy-chaining of the motor drive units. The DC power supply 290 may be configured to adjust (e.g., temporarily adjust) the magnitude of the DC bus voltage under certain conditions (e.g., in response to the number of motor drive units 244 that presently need to charge their internal energy storage elements). The DC power supply 290 may be configured to perform the functions (e.g. any of the example functions of described herein) of a system controller (e.g. the system controller 110). Further, in some examples, the DC power supply 290 may comprise a system controller (e.g. the system controller 110).

As shown in FIG. 2A, the DC power bus 292 may be a single cable (e.g., a single wire run) that may extend (e.g. in approximately a full loop) around the perimeter of an entire floor of the building 202 for charging the energy storage elements of all of the motor drive units 244 on the floor. The cable of the DC power bus 292 may comprise at least two or more electrical wires (e.g., electrical conductors) for distributing the DC bus voltage from the DC power supply 290 to the motor drive units 244 of the DC power distribution system 200. For example, the building may comprise a plurality of floors and the DC power distribution system 200 may comprise a plurality of respective power buses 292, with one of the power buses 292 on each of the floors of the building. The AC mains power source may be coupled to the DC power bus 292 on each floor of the building through a single circuit breaker 294 on each floor.

The energy storage elements of the motor drive units 244 may have a limited capacity for moving (e.g. capacity to power the movement of) the covering materials of the respective motorized window treatments 240. For example, the energy storage elements of the motor drive unit 244 may have a capacity to power a predetermined number of movements (e.g., full movements) of the covering materiel, where a full movement of the covering material may be a movement from a fully-open position to a fully-closed position or a movement from the fully-closed position to the fully-open position. The motor drive units 244 may be configured to limit (e.g. prevent future movement at the limit or after the limit is exceeded) the number of movements (e.g. full movements) and/or the total amount (e.g. a number of rotations of the roller tube) of movement, for example, over a period of time (e.g., one day). For example, the motor drive units 244 may be configured to count the number of movements (e.g. full movements) during a day and prevent future movement of the covering material after the number (e.g. predetermined number) of movements exceeds a movement threshold (e.g., less than or equal to ten full movements, such as approximately five to ten full movements). In addition, the motor drive units 244 may be configured to store the total amount of movement (e.g., in units of rotation of the motor and/or linear distance of movement of a lower edge of the covering material) during a day and prevent future movement of the covering material after the total amount of movement exceeds a distance threshold (e.g. a predetermined amount of movement). For example, the distance threshold may be a value representing four full movements of the covering material between the fully-closed position and the fully-open position. The motor drive units 244 may also be configured to limit the frequency of movements. The motor drive units 244 may once again allow movement of the covering material at the end of the present day, at the end of a predetermined period of time after movement is stopped, and/or when the internal energy storage element has charged to an acceptable level.

The motor drive units 244 may be configured to communicate with each other via a communication link (not shown), such as a wired or wireless communication link. For example, if the motor drive units 244 are configured to transmit and receive wireless signals, such as radio-frequency (RF) signals, the DC power bus 292 may simply comprise two electrical conductors for suppling voltage and current to the motor drive units. In addition, the DC power bus 292 may be packaged together with a wired digital communication link (e.g., an RS-485 digital communication link) to allow the motor drive units 244 to communicate via the wired communication link. Further, the motor drive units 244 may be configured to communicate with each other by transmitting signals via the two electrical conductors of the DC power bus 292, for example, using a power-line communication (PLC) technique.

The motor drive units 244 may be configured to learn the storage levels of the energy storage elements of the other motor drive units 244 in the DC power distribution system 200 (e.g. as a percentage of a maximum storage capacity of the energy storage elements and/or a voltage level of the energy storage elements). For example, the motor drive units 244 may each periodically transmit the storage level of its energy storage element.

The motor drive units 244 may each be configured to control when the internal energy storage element charges. Multiple motor drive units 244 may charge the internal energy storage elements at the same time. In addition, a limited number of motor drive units 244 (e.g., one at a time) may be configured to charge the internal energy storage elements at once. The motor drive units 244 may be configured to coordinate when each of the motor drive units 244 charges its internal energy storage element. The motor drive units 244 may be configured to arbitrate with each other by communicating via the communication link in order to determine which motor drive unit(s) 244 should presently be charging its internal energy storage element. The motor drive units 244 may be configured to prioritize which motor drive unit should charge its internal energy storage element based on power needs of the motor drive units. For example, the motor drive units 244 having the lowest storage level of all of the motor drive units in the DC power distribution system 200 may be configured to charge its energy storage element before the other motor drive units.

Another device, such as a system controller (e.g., the system controller 110) and/or the DC power supply 290, may communicate with the motor drive units 244 to manage which of the motor drive unit(s) 244 is presently charging its internal energy storage element (e.g. based on the storage level(s) of the internal energy storage element(s)). The system controller may be configured to learn when multiple shades are required to move at the same time (e.g., to close all of the motorized window treatments at the end of a day as part of a timeclock schedule). For example, the system controller may store a history of movements of the motorized window treatments 240 and may be configured to determine which motor drive unit 244 should charge its internal energy storage element based on a determination of a motorized window treatment that is expected to move next (e.g., the most likely motorized window treatment to move). As such, the motor drive units 244 may be configured to control the charging of their internal energy storage element (e.g., to a particular storage level) based on past and/or expected usage of the motorized window treatment 240.

The motor drive units 244 may be configured to operate in a normal power mode. In normal power mode, the motor drive units 244 may be configured rotate their motor at a normal speed. Further, in normal power mode, the motor drive units 244 may be configured to charge their internal energy storage element to maximum capacity, or in some examples, to less than the maximum capacity, such as 60% of the maximum capacity. The motor drive units 244 may be configured to operate in a low-power mode during a high power demand event and/or during an energy depletion event. A high-power demand event may be a period of high energy usage of a plurality of load control devices, for example, such as when many (e.g., more than one or a majority) of the motorized window treatments need to move at the same time and/or when many (e.g., more than one or a majority) of the internal energy storage elements of the motor drive units 244 are charging. An energy depletion event may be, for example, when the DC power distribution system 200 is operating in a condition in which many (e.g. a majority of) of the internal energy storage elements of the motor drive units 244 are depleted (e.g., below a threshold level of storage, such as 20%). When operating in the low-power mode, the motor drive units 244 may be configured to, for example, control the motor to rotate as a slower speed (e.g., to reduce power consumption of the motor) and/or delay movements or operation of the motor.

The system controller and/or the DC power supply 290 may cause the motor drive units 244 to enter the low-power mode by transmitting a message to the motor drive units 244 (e.g. to the control circuits of the motor drive units 244). For example, the system controller and/or the DC power supply 290 may be configured to transmit a digital message to the motor drive units 244 (e.g., via the RF signals 106) for causing the motor drive units to enter the low-power mode. Alternatively or additionally, the DC power supply 290 may be configured to detect the high-power demand event (e.g., by measuring a magnitude of an output current of the DC power supply) and signal to the motor drive units 244 by generating a pulse on the DC power bus 292. For example, the DC power supply 290 may generate the pulse by temporarily increasing the magnitude of the DC bus voltage and/or may temporarily decreasing the magnitude of the DC bus voltage (e.g., to approximately zero volts). The motor drive units 244 may be configured to enter the low-power mode in response to detecting the pulse in the magnitude of the DC bus voltage.

In some cases, one motorized window treatment 240 may be required to move more often than another motorized window treatment. If one of the motor drive units 244 determines that its internal energy storage element has a large storage level (e.g., as compared to the storage level of one or more of the other motor drive units), the motor drive unit 244 may be configured to share charge from its internal energy storage element with one or more of the other motor drive units (e.g. the internal energy storage elements of other motor drive units). In addition, multiple motor drive units 244 may be configured to share charge with multiple other motor drive units.

As shown in FIG. 2B, the DC power distribution system 200 may further comprise a supplemental energy storage element 296 (e.g., an external energy storage element) that may be coupled to the DC power bus 292 between two of the motor drive units 244. The supplemental energy storage element 296 may be configured to charge from the DC power supply 292, for example, at times when the internal energy storage elements of the motor drive units 244 are charged to suitable levels. For example, during an energy depletion event, the supplemental energy storage element 296 may be configured to charge the internal energy storage elements of the motor drive units 244 that are downstream (e.g. a subset of motor drive units electrically coupled to the DC power bus 292 after the supplemental energy storage element 296) from the supplemental energy storage element 296 on the DC power bus 292. At this time, the supplemental energy storage element 296 may be configured to disconnect from the DC power supply 290 and the motor drive units 244 that are upstream (e.g. a subset of motor drive units electrically coupled to the DC power bus 292 between the supplemental energy storage element 296 and the DC power supply 290) from the supplemental energy storage element 296 on the DC power bus 292. For example, the supplemental energy storage element may comprise an internal switching circuit, such as a relay, for disconnecting from the DC power supply 290. The DC power distribution system 200 may comprise more than one supplemental energy storage element 296.

The system controller may be configured to determine the existence of an energy depletion event (e.g., when the DC power distribution system 200 is operating in a condition in which most of the internal energy storage elements of the motor drive units 244 are depleted). For example, the supplemental energy storage element 296 may be configured to log in memory and/or report to the system controller when the supplemental energy storage element 296 is needed to charge the internal energy storage elements of the downstream motor drive units 244. The system controller may be configured to optimize when the motor drive units 244 move and/or charge their internal energy storage elements to avoid further energy depletion events. For example, the personal computer 166 may be configured to send an alert to a building manager to indicate that the DC power distribution system 200 was operating in a condition in which most of the internal energy storage elements of the motor drive units 244 were depleted.

As shown in FIG. 2C, the DC power supply 290 may comprise two outputs 298a, 298b that are connected to two DC power bus legs 292a, 292b (e.g. two cables electrically coupled to the motor drive units 244) that extend around the floor of the building 202. For example, the DC power supply 290 may include a first output 298a that is electrically coupled, via a first cable of the DC power bus 292a, to a first subset of the motor drive units of the plurality of motorized window treatments, and a second output 298b that is electrically coupled, via a first cable of the DC power bus 292b, to a second subset of the motor drive units of the plurality of motorized window treatments. With the two DC power bus legs 292a, 292b, the distance between the DC power supply 290 and the motor drive units 244 at the ends of the DC power bus legs 292a, 292b may be reduced.

Figure 3:
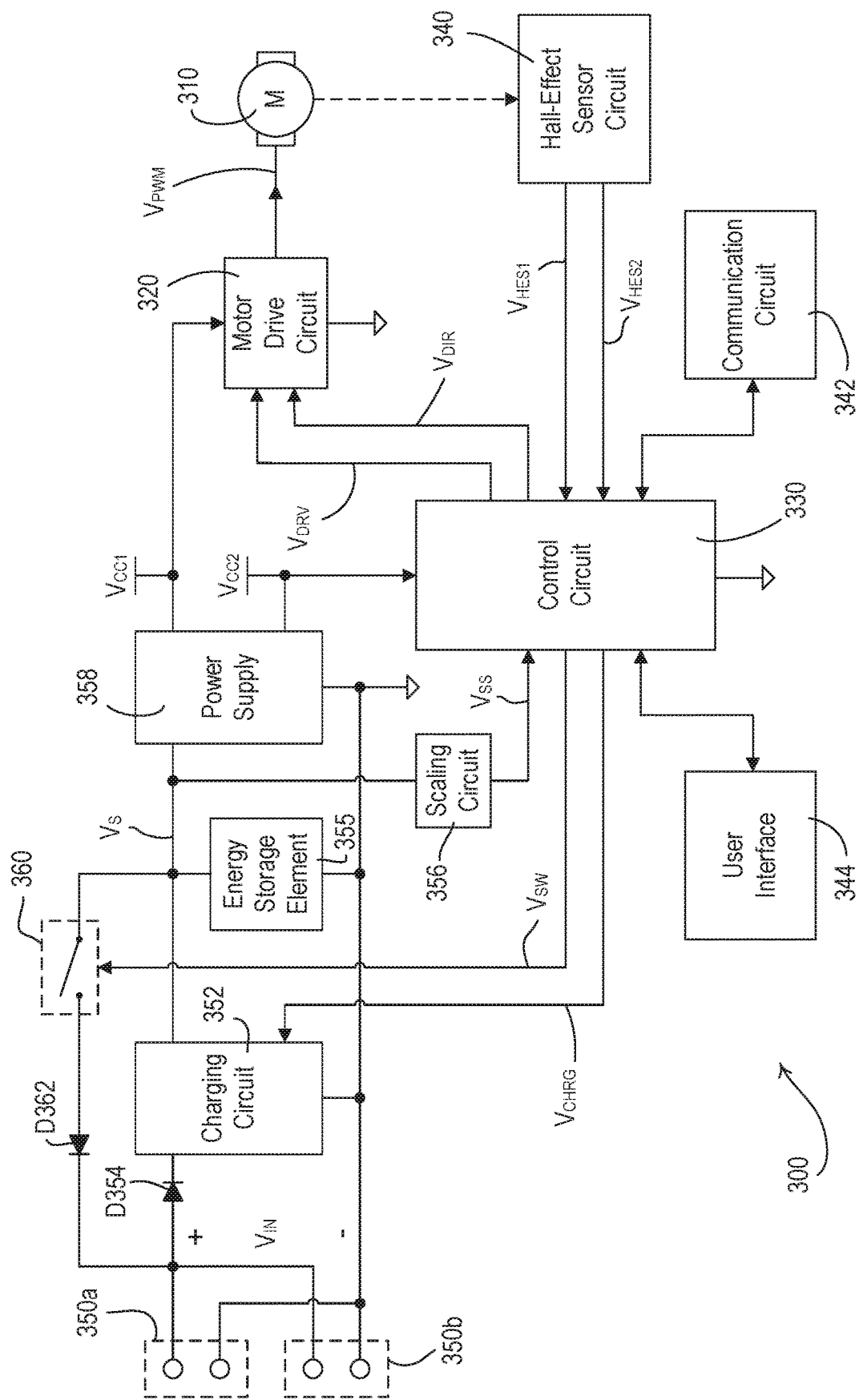
FIG. 3 is a block diagram of an example motor drive unit of a motorized window treatment.

FIG. 3 is a block diagram of an example motor drive unit 300 of a motorized window treatment (e.g., one of the motor drive units 144 of the motorized roller shades 140 of FIG. 1 and/or one of the motor drive units 244 of the motorized window treatments 240 of FIGS. 2A-2C). The motor drive unit 300 may comprise a motor 310 (e.g., a DC motor) that may be coupled for raising and lowering a covering material. For example, the motor 310 may be coupled to a roller tube of the motorized window treatment for rotating the roller tube for raising and lowering a covering material (e.g., a flexible material, such as a shade fabric). The motor drive unit 300 may comprise a load control circuit, such as a motor drive circuit 320 (e.g., an H-bridge drive circuit) that may generate a pulse-width modulated (PWM) voltage $V_{PWM}$ for driving the motor 310 (e.g. to move the covering material between a fully-open and fully-closed position).

The motor drive unit 300 may comprise a control circuit 330 for controlling the operation of the motor 310. The control circuit 330 may comprise, for example, a microprocessor, a programmable logic device (PLD), a microcontroller, an application specific integrated circuit (ASIC), a field-programmable gate array (FPGA), or any suitable processing device or control circuit. The control circuit 330 may be configured to generate a drive signal $V_{DRV}$ for controlling the motor drive circuit 320 to control the rotational speed of the motor 310. For example, the drive signal $V_{DRV}$ may comprise a pulse-width modulated signal, and the rotational speed of the motor 310 may be dependent upon a duty cycle of the pulse-width modulated signal. In addition, the control circuit 330 may be configured to generate a direction signal $V_{DIR}$ for controlling the motor drive circuit 320 to control the direction of rotation of the motor 310. The control circuit 330 may be configured to control the motor 310 to adjust a present position $P_{PRES}$ of the shade fabric of the motorized window treatment between a fully-open position $P_{OPEN}$ and a fully-closed position $P_{CLOSED}$.

The motor drive unit 300 may include a rotational position sensing circuit, e.g., a Hall effect sensor (HES) circuit 340, which may be configured to generate two Hall effect sensor (HES) signals $V_{HES1}$, $V_{HES2}$ that may indicate the rotational position and direction of rotation of the motor 310. The HES circuit 340 may comprise two internal sensing circuits for generating the respective HES signals $V_{HES1}$, $V_{HES2}$ in response to a magnet that may be attached to a drive shaft of the motor. The magnet may be a circular magnet having alternating north and south pole regions, for example. For example, the magnet may have two opposing north poles and two opposing south poles, such that each sensing circuit of the HES circuit 340 is passed by two north poles and two south poles during a full rotation of the drive shaft of the motor. Each sensing circuit of the HES circuit 340 may drive the respective HES signal $V_{HES1}$, $V_{HES2}$ to a high state when the sensing circuit is near a north pole of the magnet and to a low state when the sensing circuit is near a south pole. The control circuit 330 may be configured to determine that the motor 310 is rotating in response to the HES signals $V_{HES1}$, $V_{HES2}$ generated by the HES circuit 340. In addition, the control circuit 330 may be configured to determine the rotational position and direction of rotation of the motor 310 in response to the HES signals $V_{HES1}$, $V_{HES2}$.

The motor drive unit 300 may include a communication circuit 342 that allows the control circuit 330 to transmit and receive communication signals, e.g., wired communication signals and/or wireless communication signals, such as radio-frequency (RF) signals. For example, the motor drive unit 300 may be configured to communicate signals with external control devices (e.g., the motor drive units 244 shown in FIGS. 2A-2C). The motor drive unit 300 may further comprise a user interface 344 having one or more buttons that allow a user to provide inputs to the control circuit 330 during setup and configuration of the motorized window treatment. The control circuit 330 may be configured to control the motor 310 to control the movement of the covering material in response to a shade movement command received from the communication signals received via the communication circuit 342 or the user inputs from the buttons of the user interface 344. The user interface 344 may also comprise a visual display, e.g., one or more light-emitting diodes (LEDs), which may be illuminated by the control circuit 330 to provide feedback to the user of the motorized window treatment system. The motor drive unit 300 may comprise a memory (not shown) configured to store the present position $P_{PRES}$ of the shade fabric and/or the limits (e.g., the fully-open position $P_{OPEN}$ and the fully-closed position $P_{CLOSED}$). The memory may be implemented as an external integrated circuit (IC) or as an internal circuit of the control circuit 330.

The motor drive unit 300 may comprise one or more power connectors, such as two power connectors 350a, 350b (e.g. each comprising two power terminals, such as a positive terminal and a negative terminal) for receiving an input voltage VIN from, for example, an external power supply (e.g., the DC power supply 292) via a DC power bus (e.g., the DC power bus 292). For example, one of the two power connectors 350a, 350b may be a power-in connector that is connected to upstream motor drive units, and the other of the two power connectors 350a, 350b may be a power-out connector that is connected to downstream motor drive units, which may allow for easy wiring of the motor drive units (e.g., in the daisy-chain configuration). The motor drive unit 300 may also comprise a charging circuit 352 (e.g., that receives the input voltage VIN through a diode D354) and an energy storage element 355. The energy storage element 355 may comprise one or more supercapacitors, rechargeable batteries, or other suitable energy storage devices. A supercapacitor of a motor drive unit may have an energy storage capability in the range of approximately 12-26 J/cm$^3$. By contrast, an electrolytic capacitor may have an energy storage capability of approximately 1 J/cm$^3$ (e.g., in the range of about $\frac{1}{10}^{th}$ to $\frac{1}{30}^{th}$ of a supercapacitor), while a battery has an energy storage capability of greater than approximately 500 J/cm$^3$ (e.g., about 15 to 50 times (or more) the energy storage capability of a supercapacitor).

The charging circuit 352 may be configured to charge (e.g., trickle charge) the energy storage element 355 from the input voltage VIN to produce a storage voltage Vs across the energy storage element. The storage voltage Vs may be coupled to the control circuit 330 through a scaling circuit 356, which may generate a scaled storage voltage $V_{SS}$. The control circuit 330 may be configured to determine the magnitude of the storage voltage Vs in response to the magnitude of the scaled storage voltage $V_{SS}$.

The motor drive unit 300 may further comprise a power supply 358 that receives the storage voltage Vs and generates a first supply voltage $V_{CC1}$ (e.g., approximately 40 volts) for powering the motor 310 and a second supply voltage $V_{CC2}$ (e.g., approximately 3.3 V) for powering the control circuit 330 and other low-voltage circuitry of the motor drive unit 300. When the control circuit 330 control the motor drive circuit 320 to rotate the motor 310, the power supply 358 conducts current from the energy storage element 355. The charging circuit 352 is configured to conduct an average current from the DC power bus that is much smaller than the peak current required by the motor drive circuit 320 to rotate the motor 310. The storage level of the energy storage element 355 may decrease when the motor 310 is rotating and may slowly increase as the charging circuit 352 charges (e.g., trickle charges) the energy storage element. For example, the energy storage element 355 of the motor drive unit 300 may have a capacity to power a predetermined number of full movements (e.g., less than or equal to 10 full movements, such as approximately 5-10 full movements) of the covering materiel.

The control circuit 330 may be configured to periodically transmit messages including the storage level of the energy storage element 355 (e.g., the magnitude of the storage voltage Vs) via the communication circuit 342. The control circuit 330 may be configured to learn the storage levels of energy storage elements of the other motor drive units coupled to the DC power bus in the DC power distribution system via messages received via the communication circuit 342. The control circuit 330 may be configured to communicate with the other motor drive units to coordinate when each of the charging circuits 352 charges its energy storage element 355. The control circuit 330 may generate a charging enable signal $V_{CHRG}$ for enabling and disabling the charging circuit 352 (e.g. to charge the energy storage element 355 based on communication with the other motor drive units).

The motor drive unit 300 may also comprise a controllable switching circuit 360 coupled between the energy storage element 355 and the power connectors 350a, 350b through a diode D362. The control circuit 330 may generate a switch control signal $V_{SW}$ for rendering the controllable switching circuit 360 conductive and non-conductive. The control circuit 330 may be configured to render the controllable switching circuit 360 conductive to bypass the charging circuit 352 and the diode D354 and allow the energy storage element 335 to charge energy storage elements of other motor drive units coupled to the DC power bus. The control circuit 330 may allow the energy storage element 335 to charge energy storage elements of other motor drive units coupled to the DC power bus based on the storage levels of energy storage elements of the other motor drive units (e.g. if the storage levels of energy storage elements of the other motor drive units are low), based on a message received from the system controller, based on a message received from another motor drive unit, based on a determination that another motor drive unit is charging from the DC power bus, based on another motor drive unit in use/ moving a motor, based on a determination that another motor drive unit has an upcoming energy usage event, and/or based on another motor drive unit having a high-power demand event. Further, in some examples, the motor drive unit 300 may include a boost converter (not shown) in series with or instead of the switch 360. In such examples, the control circuit 330 may be configured to increase (e.g., boost) the voltage across the energy storage element 335 when connecting the energy storage element 335 to the DC power bus (e.g., when providing power from the energy storage element 335 to the DC power bus). The inclusion of a boost converter in the motor drive unit 300 may be beneficial when, for example, the internal storage element 335 has a low voltage rating.

Figure 4:
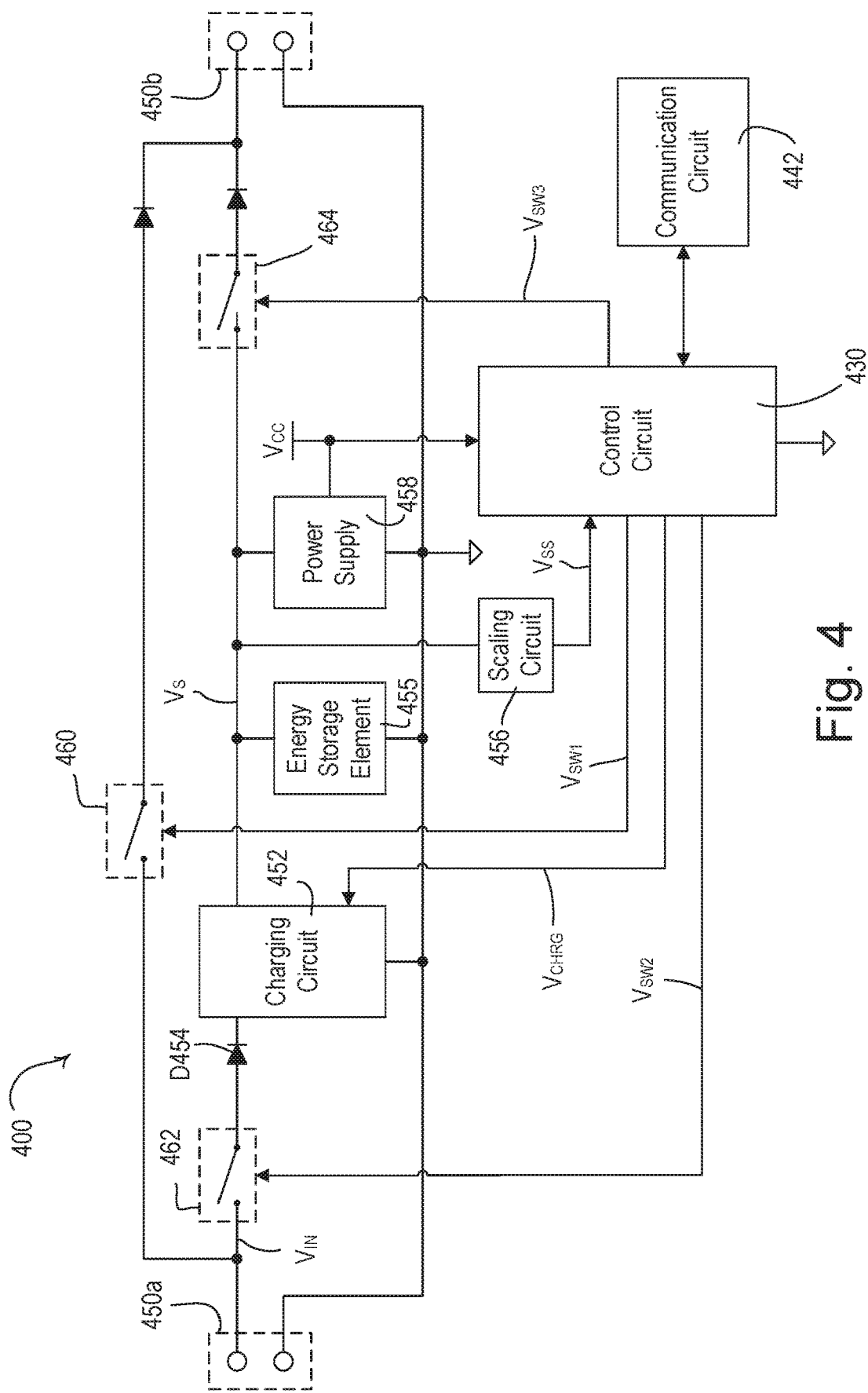
FIG. 4 is a block diagram of an example supplemental energy storage element.

FIG. 4 is a block diagram of an example supplemental energy storage element 400 (e.g., the supplemental energy storage element 296 of the DC power distribution system 200). The supplemental energy storage element 400 may comprise two power connectors 450a, 450b (e.g., a power-in connector and a power-out connector, respectively) for receiving an input voltage VIN from, for example, an external power supply (e.g., the DC power supply 290) via a DC power bus (e.g., the DC power bus 292). The supplemental energy storage element may comprise a controllable switching circuit 460 coupled between the power connectors 450a, 450b through a diode.

The supplemental energy storage element 400 may comprise a charging circuit 452 and an energy storage element 455. The energy storage element 455 may comprise one or more supercapacitors, rechargeable batteries, and/or other suitable energy storage devices. The charging circuit 452 may receive an input voltage VIN through a diode D454. The charging circuit 452 may be configured to charge (e.g., trickle charge) the energy storage element 455 from the input voltage VIN to produce a storage voltage Vs across the energy storage element. The supplemental energy storage element 400 may comprise a control circuit 430 for controlling the charging circuit 452. The control circuit 430 may comprise, for example, a microprocessor, a programmable logic device (PLD), a microcontroller, an application specific integrated circuit (ASIC), a field-programmable gate array (FPGA), or any suitable processing device or control circuit. The storage voltage Vs may be coupled to the control circuit 430 through a scaling circuit 456, which may generate a scaled storage voltage $V_{SS}$. The control circuit 430 may be configured to determine the magnitude of the storage voltage Vs in response to the magnitude of the scaled storage voltage $V_{SS}$. The supplemental energy storage element 400 may further comprise a power supply 458 that receives the storage voltage Vs and generates a supply voltage $V_{CC}$ (e.g., approximately 3.3 V) for powering the control circuit 430 and other low-voltage circuitry of the supplemental energy storage element 400.

The control circuit 430 may generate a switch control signal $V_{SW1}$ for rendering the controllable switching circuit 460 conductive and non-conductive (e.g. in response to a message received from external devices such as the power supply, the system controller, and/or load control devices). The control circuit 430 may be configured to render the controllable switching circuit 460 conductive to bypass the charging circuit 452 and allow the energy storage element 455 to charge energy storage elements of drive circuits (e.g., motor drive units) coupled to the DC power bus. The supplemental energy storage element 400 may also comprise a controllable switching circuit 462. The control circuit 430 may generate a switch control signal $V_{SW2}$ for rendering the controllable switching circuit 462 conductive and non-conductive (e.g. in response to a message received from external devices such as the power supply, the system controller, and/or load control devices). The control circuit 430 may be configured to render the controllable switching circuit 462 conductive to allow the energy storage element 455 to charge from the input voltage VIN.

The supplemental energy storage element 400 may also comprise a controllable switching circuit 464. The control circuit 430 may generate a switch control signal $V_{SW3}$ for rendering the controllable switching circuit 464 conductive and non-conductive (e.g. in response to a message received from external devices such as the power supply, the system controller, and/or load control devices). The control circuit 430 may be configured to render the controllable switching circuits 462 and 460 non-conductive and the controllable switching circuit 464 conductive, for example, to charge the internal energy storage elements of one or more devices (e.g., motor drive units) connected to the DC power bus.

The supplemental energy storage element 400 may include a communication circuit 442 that allows the control circuit 430 to transmit and receive communication signals, e.g., wired communication signals and/or wireless communication signals, such as radio-frequency (RF) signals. For example, the supplemental energy storage element 400 may be configured to communicate signals with external control devices, such as those connected to the DC power bus. The supplemental energy storage element 400 may receive messages from other devices (e.g. those connected to the DC power bus, such as a power supply, a system controller, and/or load control devices) and may control one or more internal switches, such as the controllable switching circuit 460, 462, and/or 464 in response to the received message.

Further, in some examples, the supplemental energy storage element 400 may include a boost converter (not shown) in series with or instead of the switch 464. In such examples, the control circuit 430 may be configured to increase (e.g., boost) the voltage across the energy storage element 455 when connecting the energy storage element 455 to the DC power bus (e.g., when providing power from the energy storage element 455 to the DC power bus). The inclusion of a boost converter in the supplemental energy storage element 400 may be beneficial when, for example, the internal storage element 455 has a low voltage rating.

Figure 5:
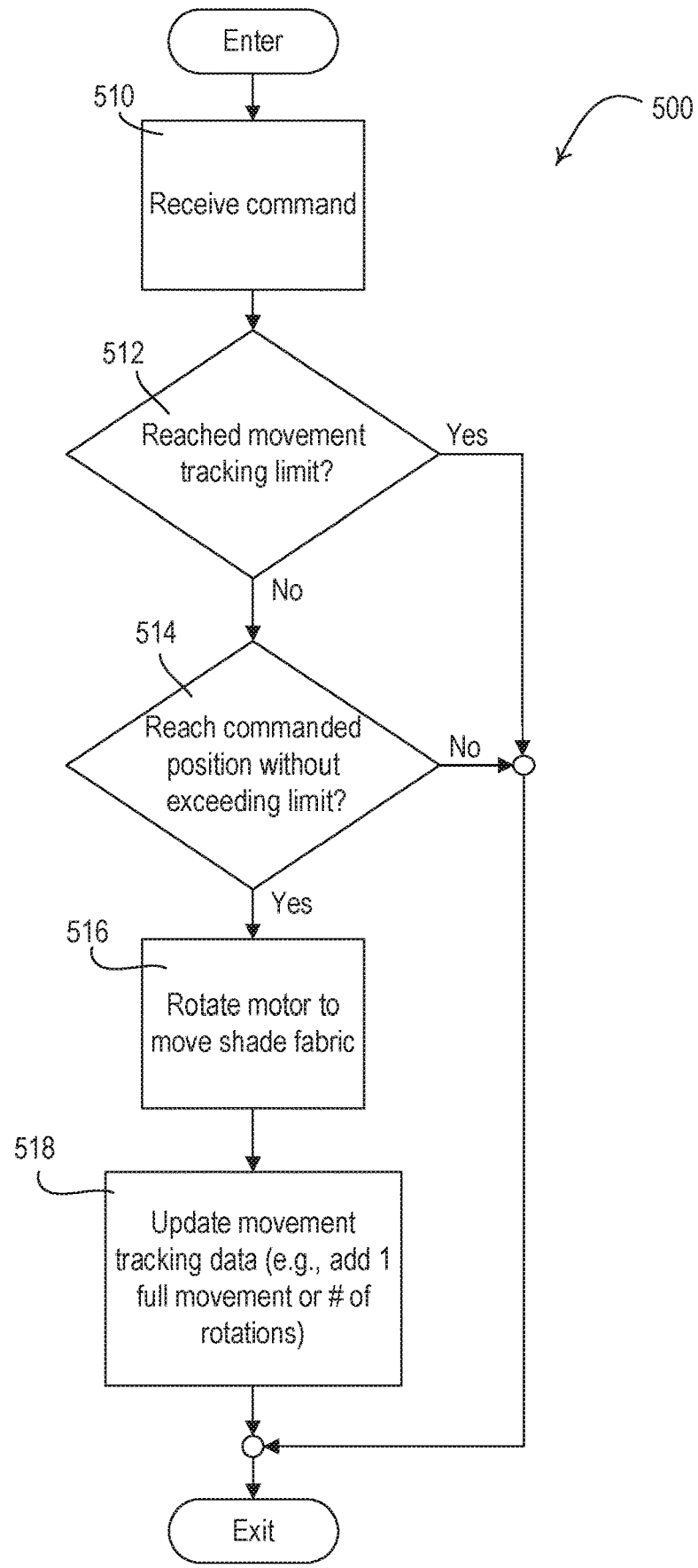
FIG. 5 is a flowchart of an example movement tracking control procedure that may be executed by a control circuit of a load control device.

FIG. 5 is a flowchart of an example movement tracking control procedure 500 that may be executed by a control circuit of a load control device (e.g., the control circuit of the motor drive unit 144, a control circuit of the motor drive units 244, the control circuit 330 of the motor drive unit 300, etc.). At 510, the control circuit may receive a command (e.g. a command to move a covering material of a window treatment). At 512, the control circuit may determine if a movement tracking limit has been reached. For example, the control circuit may store movement tracking data that indicates a number of movements of the covering material (e.g. a number of full movements between a fully-open and a fully-closed position) and/or an amount of movement of the covering material (e.g., in units of rotations of the motor and/or linear distance of movement of a lower edge of the covering material), for example, over a period of time. For example, the period of time may be a static period of time, such as one day, or the period of time may be a rolling period, such as 12 hours or 24 hours. The control circuit may reset the movement tracking data at the expiration of the period of time (e.g., at the end of the day). The control circuit may be preconfigured with the movement tracking limit and/or may receive the movement tracking limit from the system controller. At 512, the control circuit may determine whether the movement tracking limit has been reached by comparing the movement tracking data to the movement tracking limit.

If the control circuit determines that the movement tracking limit has been reached at 512, the control circuit may disregard the received command (e.g. by not moving the covering material in response to the received command) and exit the control procedure 500. Accordingly, in some examples, in response to a determination that the movement tracking limit has been reached at 512, the control circuit does not generate drive signals for controlling the motor drive circuit based on received commands after the limit is reached or exceeded, for example, for the remainder of a static period of time (e.g., for the remainder of the day) and/or for a part or the entirety of a rolling period of time.

If the control circuit determines that the movement tracking limit has not been reached at 512, then at 514, the control circuit may determine if a commanded position (e.g. a position that the covering material would be at after executing the received command) can be reached without exceeding the movement tracking limit. For example, the command may indicate a number of movements of the covering material and/or an amount movement of the covering material. The control circuit may compare the combination of the movement tracking data and the number and/or amount of movement(s) indicated by the command to the movement tracking limit. At 514, if the control circuit determines that the movement tracking limit would be exceeded by moving to the commanded position, then the control circuit may disregard the received command (e.g. not move the covering material in response to the received command), and the control circuit may exit the control procedure 500. If the control circuit determines that the commanded position can be reached without exceeding the movement tracking limit at 514, then the control circuit may execute the received command (e.g. rotate the motor to move a covering material to the commanded position) at 516. At 518, the control circuit may update the movement tracking data based on the command, for example, by adding the number of movements or number of rotations to the movement tracking data, and exit the control procedure 500. Though described as a control circuit executing control procedure 500, the control procedure 500 may be performed by a system controller alone or in conjunction with a control circuit of a load control device.

Figure 6:
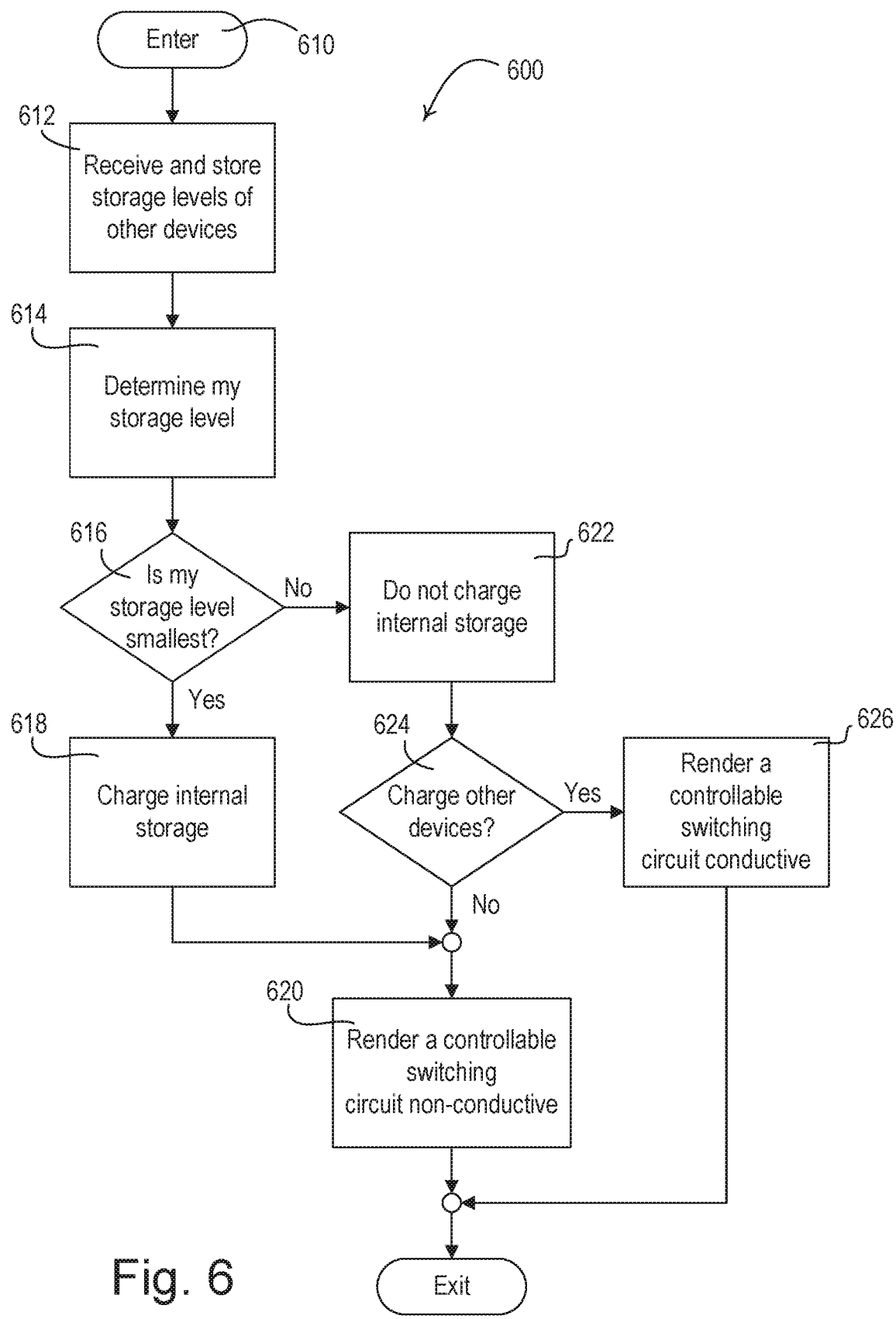
FIG. 6 is a flowchart of an example internal storage charging control procedure that may be executed by a control circuit of a load control device.

FIG. 6 is a flowchart of an example internal storage charging control procedure 600 that may be executed by a control circuit of a load control device (e.g. the control circuit of the motor drive unit 144, a control circuit of the motor drive units 244, the control circuit 330 of the motor drive unit 300, etc.). The control circuit may be configured to receive and/or store the storage level(s) of the internal energy storage element(s) of the other device(s) (e.g. load control devices such as motor drive units) in a DC power distribution system (e.g., the DC power distribution system 200). For example, the control circuit may execute the control procedure 600 periodically. In addition, the control circuit may start the control procedure 600, for example, in response to a timeclock event/schedule and/or in response to the internal energy storage of the load control device or supplemental energy storage element reaching a preconfigured level.

At 612, the control circuit may receive and/or store the storage level(s) of other device(s) (e.g. load control devices such as motor drive units). At 614, the control circuit may determine the storage level of the internal energy storage element of the load control device, for example, by sampling a storage voltage level (e.g., the scaled storage voltage $V_{SS}$) of the internal energy storage element. At 616, the control circuit may determine if the storage level of its internal energy storage element is the lowest of all internal energy storage elements of the devices within the DC power distribution system (e.g. based on a comparison of the received storage levels of the other devices in the DC power distribution system and the storage level of the load control device). If the control circuit determines that the storage level of its internal energy storage element is the lowest at 616, then the control circuit may charge its internal energy storage element at 618, and may render a controllable switching circuit (e.g., the controllable switching circuit 360) of the load control device non-conductive, at 620. After rendering the controllable switching circuit non-conductive, the control circuit may exit the control procedure 600.

If the control circuit determines that the storage level of its internal energy storage element is not the lowest at 616, then the control circuit may not charge its internal energy storage element at 622. At 624, the control circuit may determine if the load control device should charge an energy storage element of another device in the DC power distribution system. When determining whether to charge another device in the DC power distribution system, the control circuit may, for example, consider the storage level of the other devices, which other device has the lowest storage level, a message received from the system controller, a message received from another device, whether another device is charging from the DC power bus, whether another device is in use (e.g., whether another device is experiencing a high-power demand event), a timeclock schedule, and/or a history of usage events of the other devices (e.g., whether another device has an upcoming energy usage event).

If the control circuit determines that the load control device should not charge an energy storage element of another device in the DC power distribution system at 624, the control circuit may render controllable switching circuit non-conductive at 620 and exit the control procedure 600. If the control circuit determines that the load control device should charge another device in the DC power distribution system at 624, the control circuit may render the controllable switching circuit of the load control device conductive at 626 (e.g., for a predetermined amount of time). By rendering the controllable switching circuit conductive, the control circuit may bypass the charging circuit (e.g., the charging circuit 352 and the diode D354) and allow its internal energy storage element to charge energy storage element(s) of other devices coupled to the DC power bus. After the control circuit renders the controllable switching circuit conductive at 626, the control circuit may exit the control procedure 600.

Although described as a control circuit of a load control device executing the control procedure 600, the control procedure 600 may be performed by a control circuit of a supplemental energy storage element (e.g. a control circuit of the supplemental energy storage element 296, the control circuit 430 of the supplemental energy storage element 400, etc.). The supplemental energy storage element may have a first controllable switching circuit (e.g. controllable switching circuit 460), a second controllable switching circuit (e.g. controllable switching circuit 462), and a third controllable switching circuit (e.g. controllable switching circuit 464). The control circuit of the supplemental energy storage element may generate a switch control signal $V_{SW1}$, $V_{SW2}$, $V_{SW3}$, for rendering each of the controllable switching circuits conductive and non-conductive. If control procedure 600 is performed by the control circuit of a supplemental energy storage element, then instead of rendering a controllable switching circuit of the load control device non-conductive at 620, the control circuit may render the third controllable switching circuit of the supplemental energy storage element non-conductive and the second controllable switching circuit of the supplemental energy storage element conductive (e.g. to allow the supplemental energy storage element to charge) at 620. Further, instead of rendering a controllable switching circuit of the load control device conductive at 626, the control circuit may render the third controllable switching circuit conductive, the first controllable switching circuit non-conductive, and the second controllable switching circuit 462 non-conductive (e.g. to allow the supplemental energy storage element to charge energy storage elements of motor drive units coupled to the DC power distribution system).

Figure 7:
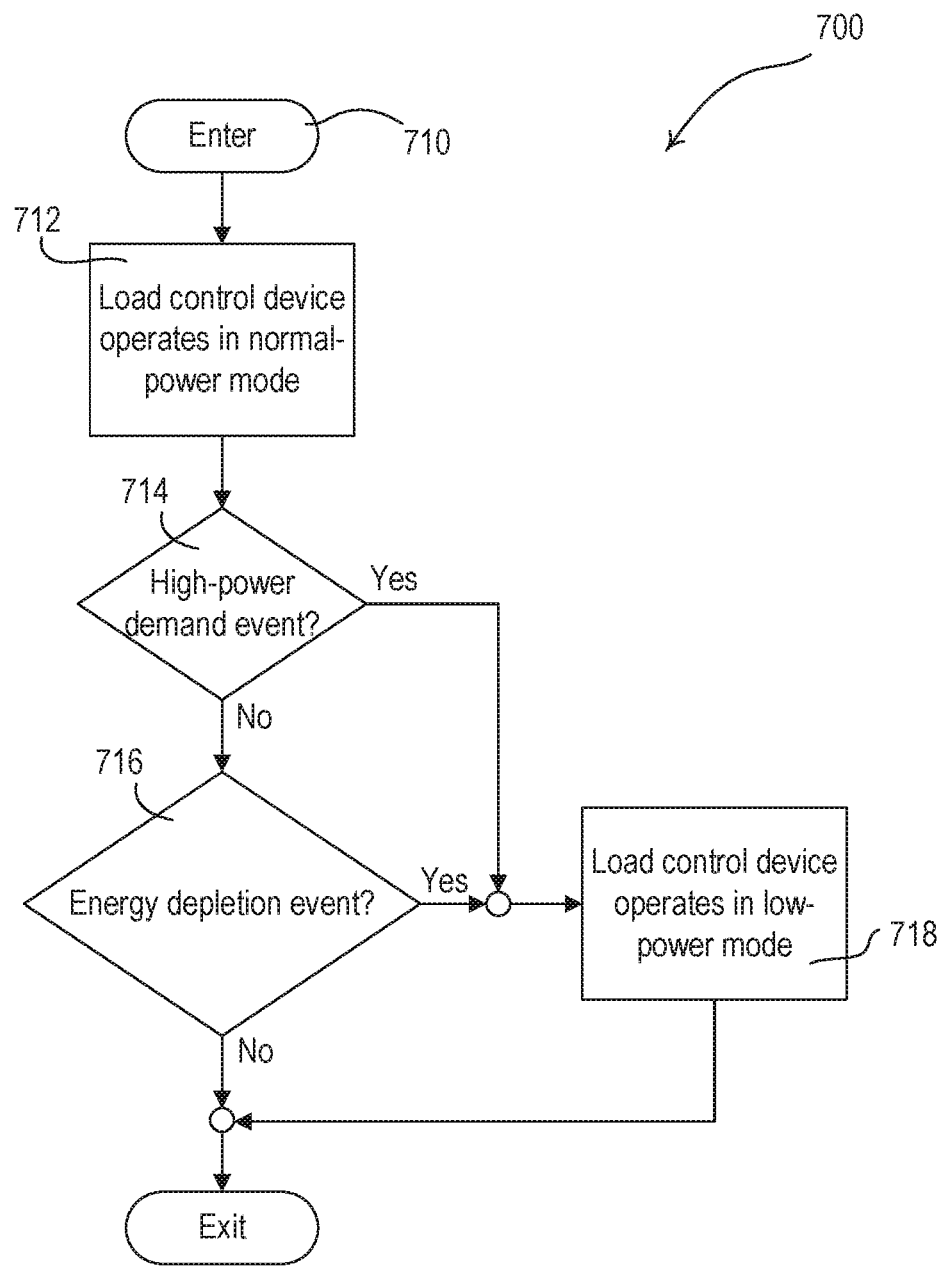
FIG. 7 is a flowchart of an example low-power mode control procedure that may be executed by a control circuit of a load control device.

FIG. 7 is a flowchart of an example low-power mode control procedure 700 that may be executed by a control circuit of a load control device (e.g. the control circuit of the motor drive unit 144, a control circuit of the motor drive units 244, the control circuit 330 of the motor drive unit 300, etc.). The control circuit may execute the control procedure 700 periodically or based on a timeclock schedule/event. At 712, the load control device may operate in a normal power mode. In the normal power mode, the control circuit may be configured to control a drive circuit according to normal operating conditions. For example, if the load control device is a motorized window treatment, the control circuit may be configured to control a motor drive unit (e.g., the motor drive unit 244) to rotate a motor (e.g., the motor 310) at a normal speed. Further, in the normal power mode, the control circuit may be configured to charge its internal energy storage element to maximum capacity, or in some examples, to less than the maximum capacity, such as 60% of the maximum capacity.

At 714, the control circuit may determine if a high-power demand event is occurring, for example, based on a received message (e.g. from the system controller, one or more other load control devices, and/or the DC power supply 290), the magnitude of a DC bus voltage, and/or a timeclock schedule/event. In some examples, the control circuit may receive the message based on a measurement of a magnitude of an output voltage of a DC power supply (e.g., the DC power supply 290). The control circuit may receive the message via wireless communication (e.g. RF signals) and/or via wired communication (e.g. a pulse on the DC bus voltage and/or power-line communication (PLC)). For example, a high-power demand event may be when many of the motorized window treatments need to move at the same time and/or when a DC power distribution system (e.g. the DC power distribution system 200) is operating in a condition in which many (e.g. a majority) of the internal energy storage elements of the motor drive units are depleted. If the control circuit determines that a high-power demand event is occurring at 714, then the load control device may operate in the low-power mode at 718. When operating in the low-power mode, the control circuit may be configured to control the drive circuit using operating conditions that require less power than the normal mode. For example, if the load control device is a motorized window treatment, then the control circuit may be configured to control the motor drive unit to rotate the motor at a slower speed (e.g., to reduce power consumption of the motor) than the speed used during normal-power mode and/or may delay the control of the motor drive unit when operating in the low-power mode. The load control device may operate in the low-power mode until the high-power demand event ends, for a predetermined amount of time, and/or until a message is received (e.g. from the system controller, power supply, and/or other load control devices). After operating in low-power mode at 718, the control circuit may exit the control procedure 700 (e.g., based on a received message/command).

If the control circuit determines that a high-power demand event is not occurring at 714, then the control circuit may determine if an energy depletion event is occurring at 716 (e.g., determine whether the internal energy storage elements of many (e.g. a majority of) load control devices of the DC power distribution system are depleted). The control circuit may determine the existence of an energy depletion event based on a received message/command (e.g. from the system controller, power supply, and/or other load control devices). For example, the control circuit may determine whether the internal energy storage elements of many load control devices are below a threshold power level (e.g., less than 20% of maximum capacity). If the control circuit determines that an energy depletion event is occurring at 716, then the load control device may operate in a low-power mode at 718. After operating in the low-power mode at 718, the control circuit may exit the control procedure 700 (e.g. if the internal energy storage elements that were depleted now exceed the power threshold). If the control circuit determines that the internal energy storage elements of many load control devices are not depleted at 716, then the control circuit may exit the control procedure 700.

Figure 8:
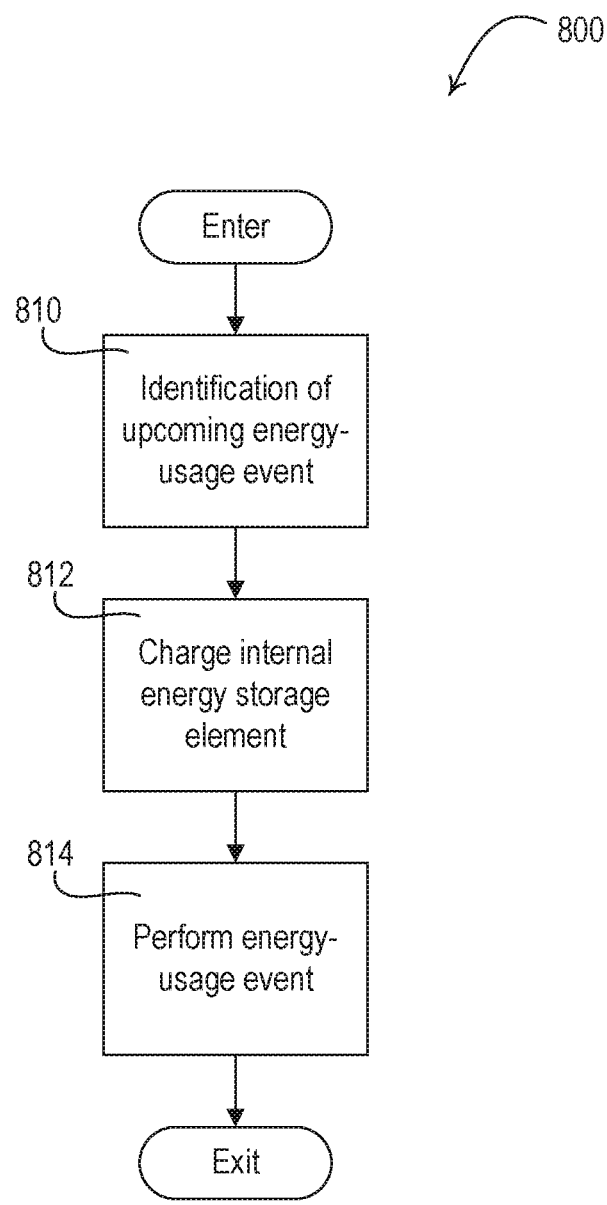
FIG. 8 is a flowchart of an example pre-charge control procedure that may be executed by a control circuit of a load control device.

FIG. 8 is a flowchart of an example pre-charge control procedure 800 that may be executed by a control circuit of a load control device (e.g. the control circuit of the motor drive unit 144, a control circuit of the motor drive units 244, the control circuit 330 of the motor drive unit 300, etc.). For example, the control circuit may execute the control procedure 800 periodically. In addition, the control circuit may execute the control procedure 800, for example, in response to receiving a message from a system controller and/or based on a timeclock schedule/event. At 810, the control circuit may identify an upcoming energy-usage event (e.g. based on a timeclock schedule and/or past usage). Examples of upcoming energy-usage event may be, for example, movements of a motor (e.g., the motor 310) (e.g., to move a covering material), turning on or adjusting an intensity of a lighting load, etc.

At 812, the control circuit may charge its internal energy storage element (e.g. to an elevated level) in preparation for the upcoming energy-usage event. In some example, the load control device may maintain the internal energy storage element to a power level that is less than the maximum power level (e.g., at 60% of the maximum energy storage capacity of the internal energy storage element). In such examples, and in preparation for the upcoming energy-usage event, the control circuit may charge its internal energy storage element to the maximum power level in preparation for the upcoming energy-usage event (e.g., prior to driving a motor to rotate a roller tube of a motorized window treatment). Further, in some instances, the control circuit may not be charging its internal energy storage element because the control circuit is allowing other load control devices of the system to charge their respective internal energy storage elements. And as such, for example, the internal energy storage element of the load control device may be at a power level that is less than the maximum power level. In such instance, the control circuit may begin charging its internal energy storage element in response to receiving an indication of an upcoming energy-usage event, and for example, may stop charging the internal energy storage elements of the other load control devices.

At 814, the control circuit may perform the energy-usage event. For example, if the load control device is a motorized window treatment, then the control circuit may control a motor drive unit (e.g., the motor drive unit 320) to drive the motor to move the covering material (e.g. consuming the charge that was stored in preparation for the energy-usage event). After the control circuit has performed the energy-usage event, the control circuit may exit the control procedure 800.

What is claimed is:

1. A load control system for controlling a plurality of electrical loads, the load control system comprising:
   a plurality of load control devices configured to be coupled in parallel with each other across a DC power bus, wherein each load control device comprises:
   an internal energy storage element configured to charge from a DC bus voltage;
   an internal power supply configured to conduct current from the internal energy storage element and generate a supply voltage;
   a load control circuit configured to receive the supply voltage and control power delivered to an electrical load; and
   a control circuit configured to:
      control the load control circuit for controlling the power delivered to the electrical load;
      control when the internal energy storage element charges from the DC bus voltage;
      send an indication of a storage level of the internal energy storage element;
      receive an indication of a storage level of an internal energy storage element of a second load control device of the plurality of load control devices; and
      determine to charge the internal energy storage element from the DC power bus based on a comparison between the storage level of the internal energy storage element and the received storage level of the internal energy storage element of the second load control device.

2. The load control system of claim 1, wherein each of the plurality of load control devices is a motor drive unit for a motorized window treatment;
   wherein the load control circuit of each of the plurality of load control devices comprises a motor drive circuit for a motor that is configured to control movement of a covering material of the motorized window treatment to control the amount of daylight entering a space; and
   wherein the motor drive circuit is powered by the supply voltage.

3. The load control system of claim 2, wherein each of the motor drive units are configured to determine whether to charge the respective internal energy storage element based on a respective storage level of the internal energy storage element and a storage level of an internal energy storage element of a second one of the motor drive units for a second motorized window treatment.

4. The load control system of claim 3, wherein the motor drive unit is configured to charge its internal energy storage element in response to a determination that the storage level of its internal energy storage element is the smallest of all internal energy storage elements of the plurality of load control devices.

5. The load control system of claim 2, wherein the motor drive unit is configured to receive an indication of a storage level of an internal energy storage element of each of the plurality of load control devices.

6. The load control system of claim 5, wherein the motor drive unit is configured to determine, based on the indication of the storage level of the internal energy storage element of the load control device, that a second one of the motor drive units is charging the internal energy storage element of the second motor drive unit and, in response, supply power to the DC power bus from the internal energy storage element of the motor drive unit.

7. The load control system of claim 6, wherein the motor drive unit is configured to render a controllable switching circuit of the motor drive unit conductive to allow the internal energy storage element to supply power to the DC power bus.

8. The load control system of claim 2, further comprising:
   a system controller configured to monitor a storage level of the internal energy storage element of each of the motor drive units and determine to charge the internal energy storage element of one of the motor drive units based on the storage level of the internal energy storage element of each of the motor drive units.

9. A load control device for controlling an electrical load in a load control system, the load control system having a plurality of load control devices for controlling a plurality of electrical loads, wherein the plurality of load control devices are configured to be coupled in parallel with each other across a DC power bus to receive a DC bus voltage, the load control device comprising:
   an internal energy storage element configured to charge from the DC bus voltage;
   an internal power supply configured to conduct current from the internal energy storage element and generate a supply voltage;
   a load control circuit configured to receive the supply voltage and control power delivered to the electrical load; and
   a control circuit configured to:
      control the load control circuit for controlling the power delivered to the electrical load;
      control when the internal energy storage element charges from the DC bus voltage;

send an indication of a storage level of the internal energy storage element;
receive an indication of a storage level of an energy storage element of another load control device; and
determine to charge the internal energy storage element from the DC power bus based on the storage level of the internal energy storage element and the received storage level of the energy storage element of the other load control device.

10. The load control device of claim 9, wherein the load control device is a motor drive unit for a motorized window treatment;
wherein the load control circuit comprises a motor drive circuit for a motor that is configured to control movement of a covering material of the motorized window treatment to control the amount of daylight entering a space; and
wherein the motor drive circuit is powered by the supply voltage.

11. The load control device of claim 10, wherein the control circuit is configured to charge the internal energy storage element in response to a determination that the storage level of the internal energy storage element is the smallest of all internal energy storage elements of the plurality of load control devices.

12. The load control device of claim 10, wherein the control circuit is configured to receive a storage level of an internal energy storage element of each of the plurality of load control devices.

13. The load control device of claim 10, further comprising:
a charging circuit configured to charge the internal energy storage element from the DC power bus to produce a storage voltage across the energy storage element.

14. The load control device of claim 13, further comprising:
a controllable switching circuit coupled between the internal energy storage element and a connector, the connector configured to receive the DC bus voltage from the DC power bus; and
wherein the control circuit is configured to render the controllable switching circuit conductive to bypass the charging circuit and allow the internal energy storage element to supply power to the DC power bus to charge the internal energy storage element of the other load control device coupled to the DC power bus.

15. The load control device of claim 13, further comprising:
a boost converter configured to increase the storage voltage across the energy storage element when connecting the energy storage element to the DC power bus to charge the internal energy storage element of the other load control device coupled to the DC power bus.

16. The load control device of claim 10, wherein the control circuit is configured to determine that a different motor drive unit is charging its internal energy storage element and, in response, supply power to the DC power bus from the internal energy storage element of the motor drive unit.

17. The load control device of claim 13, wherein the control circuit is configured to receive a message from a system controller that causes the control circuit to charge the internal energy storage element or cause the internal energy storage element to supply power to the DC power bus to charge the internal energy storage element of the other load control device coupled to the DC power bus.

18. A method for controlling an electrical load in a load control system, the load control system having a plurality of load control devices for controlling a plurality of electrical loads, wherein the plurality of load control devices are configured to be coupled in parallel with each other across a DC power bus to receive a DC bus voltage, the method comprising:
receiving the DC bus voltage from the DC power bus;
controlling when an internal energy storage element charges from the DC bus voltage;
controlling a load control circuit for controlling power delivered to an electrical load using current conducted from the internal energy storage element;
sending an indication of a storage level of the internal energy storage element;
receiving an indication of a storage level of an energy storage element of another load control device; and
determining to charge the internal energy storage element from the DC bus voltage based on a comparison between the storage level of the internal energy storage element and the received storage level of the energy storage element of the other load control device.

19. The method of claim 18, further comprising:
receiving a storage level of an internal energy storage element of each of the plurality of load control devices; and
charging the internal energy storage element in response to a determination that the storage level of the internal energy storage element is the smallest of all internal energy storage elements of the plurality of load control devices.

20. The method of claim 18, further comprising:
rendering the controllable switching circuit conductive to allow the internal energy storage element to supply power to the DC power bus to charge the internal energy storage element of the other load control device coupled to the DC power bus.

* * * * *